(12) United States Patent
Marchiori et al.

(10) Patent No.: US 10,114,938 B2
(45) Date of Patent: Oct. 30, 2018

(54) SECURE ELECTRONIC LOCK

(71) Applicant: UTC FIRE & SECURITY AMERICAS CORPORATION, INC., Bradenton, FL (US)

(72) Inventors: Alan Marchiori, Glastonbury, CT (US); Ulf J. Jonsson, South Windsor, CT (US); Vijaya Ramaraju Lakamraju, Longmeadow, MA (US); Nicholas Charles Soldner, Southbury, CT (US); Ritesh Khire, Manchester, CT (US); Joseph Zacchio, Wethersfield, CT (US); Adam Kuenzi, Silverton, OR (US); Ron Chapin, Gervais, OR (US)

(73) Assignee: UTC FIRE AND SECURITY AMERICAS CORPORATION, INC., Bradenton, FL (US)

( * ) Notice: Subject to any disclaimer, the term of this patent is extended or adjusted under 35 U.S.C. 154(b) by 124 days.

(21) Appl. No.: 14/778,683

(22) PCT Filed: Mar. 20, 2014

(86) PCT No.: PCT/US2014/031315
§ 371 (c)(1),
(2) Date: Sep. 21, 2015

(87) PCT Pub. No.: WO2014/153452
PCT Pub. Date: Sep. 25, 2014

(65) Prior Publication Data
US 2016/0048673 A1    Feb. 18, 2016

Related U.S. Application Data

(60) Provisional application No. 61/804,418, filed on Mar. 22, 2013.

(51) Int. Cl.
G06F 21/35    (2013.01)
G07C 9/00    (2006.01)
G06F 21/36    (2013.01)

(52) U.S. Cl.
CPC .............. *G06F 21/35* (2013.01); *G06F 21/36* (2013.01); *G07C 9/00174* (2013.01); *G07C 2209/04* (2013.01); *G07C 2209/62* (2013.01)

(58) Field of Classification Search
CPC ............ G07C 9/00174; G07C 2209/04; G07C 2209/62
See application file for complete search history.

(56) References Cited

U.S. PATENT DOCUMENTS 4,833,465 A  *  5/1989  Abend ................ E05B 47/0012
                                                                    292/144
5,701,828 A     12/1997  Benore et al.
(Continued)

FOREIGN PATENT DOCUMENTS

CA    2751893 A1    8/2010
EP    1842990 A2    10/2007
(Continued)

OTHER PUBLICATIONS

Chinese Office Action for application CN 201480029284.5, dated Nov. 1, 2016, 6pages.
(Continued)

*Primary Examiner* — Ellen Tran
(74) *Attorney, Agent, or Firm* — Cantor Colburn LLP

(57) ABSTRACT

Embodiments are directed to simulating an operation of a mechanical lock in an electronic context, comprising: applying a contactless wireless credential to a lock, authenticating the credential, unlocking the lock to provide access to a resource protected by the lock based on having authenticated the credential, determining a security level associated with
(Continued)

the lock, and conditionally capturing the credential based on the security level.

22 Claims, 5 Drawing Sheets

(56) References Cited

U.S. PATENT DOCUMENTS

| | | | |
|---|---|---|---|
| 5,905,653 | A | 5/1999 | Higham et al. |
| 5,933,086 | A | 8/1999 | Tischendorf et al. |
| 6,581,986 | B2 | 6/2003 | Roatis et al. |
| 6,874,828 | B2 | 4/2005 | Roatis et al. |
| 7,170,998 | B2 | 1/2007 | McLintock et al. |
| 7,196,610 | B2 | 3/2007 | Straumann et al. |
| 7,209,029 | B2 | 4/2007 | Coelho et al. |
| 7,606,558 | B2 | 10/2009 | Despain et al. |
| 7,647,369 | B2 | 1/2010 | Hoblit |
| 7,741,969 | B2 | 6/2010 | Linford |
| 7,880,584 | B2 | 2/2011 | Larson et al. |
| 8,035,477 | B2 | 10/2011 | Kirkjan |
| 8,035,479 | B2 | 10/2011 | Tran |
| 8,058,971 | B2 | 11/2011 | Harkins et al. |
| 8,134,846 | B2 | 3/2012 | Lang et al. |
| 8,138,886 | B1 | 3/2012 | Chang |
| 8,160,548 | B2 | 4/2012 | Aaron |
| 8,161,782 | B2 | 4/2012 | Haakansson et al. |
| 8,164,419 | B2 | 4/2012 | Fisher |
| 8,186,188 | B1 | 5/2012 | Brown |
| 8,266,442 | B2 | 9/2012 | Burke |
| 8,299,895 | B2 | 10/2012 | Harris |
| 8,331,544 | B2 | 12/2012 | Kraus et al. |
| 8,335,488 | B2 | 12/2012 | Despain et al. |
| 8,358,197 | B2 | 1/2013 | Tran |
| 2003/0231102 | A1 | 12/2003 | Fisher |
| 2005/0051621 | A1* | 3/2005 | Wong ............... G07C 9/00309 235/382.5 |
| 2009/0254995 | A1* | 10/2009 | John ............... G06F 21/88 726/27 |
| 2010/0141381 | A1 | 6/2010 | Bliding et al. |
| 2010/0268379 | A1 | 10/2010 | Woodard et al. |
| 2010/0283576 | A1 | 11/2010 | Loughlin et al. |
| 2011/0119734 | A1 | 5/2011 | Crawford |
| 2011/0254659 | A1 | 10/2011 | Bowen et al. |
| 2011/0291798 | A1 | 12/2011 | Schibuk |
| 2012/0096909 | A1 | 4/2012 | Hart et al. |
| 2012/0154115 | A1 | 6/2012 | Herrala |
| 2012/0157079 | A1 | 6/2012 | Metivier |
| 2012/0157080 | A1 | 6/2012 | Metivier |
| 2012/0213362 | A1 | 8/2012 | Bliding et al. |
| 2012/0222103 | A1 | 8/2012 | Bliding et al. |
| 2012/0249290 | A1 | 10/2012 | Marsh et al. |
| 2012/0280783 | A1 | 11/2012 | Gerhardt et al. |
| 2012/0280784 | A1 | 11/2012 | Gaviria Velez et al. |
| 2012/0280789 | A1 | 11/2012 | Gerhardt et al. |
| 2012/0280790 | A1 | 11/2012 | Gerhardt et al. |
| 2012/0299700 | A1 | 11/2012 | Davis |
| 2013/0008213 | A1 | 1/2013 | Brown et al. |
| 2013/0009770 | A1 | 1/2013 | Yeager et al. |
| 2013/0014219 | A1 | 1/2013 | Kraus et al. |
| 2013/0014552 | A1 | 1/2013 | Bench et al. |
| 2013/0027177 | A1 | 1/2013 | Denison |
| 2013/0213100 | A1* | 8/2013 | Cohen ............... E05B 47/0611 70/283.1 |
| 2013/0244575 | A1* | 9/2013 | Forutanpour ....... H04M 1/7253 455/41.1 |

FOREIGN PATENT DOCUMENTS

| | | |
|---|---|---|
| EP | 1646937 B1 | 6/2011 |
| WO | 2005124655 A2 | 12/2005 |
| WO | 2008101930 A1 | 8/2008 |
| WO | 2010048350 A1 | 4/2010 |

OTHER PUBLICATIONS

European Office Action for application EP 14722477.8, dated Oct. 10, 2017, 6 pages.
International Search Report for application PCT/US2014/031315, dated Aug. 4, 2014, 5 pages.
Written Opinion for application PCT/US2014/031315, dated Aug. 4, 2014, 5 pages.

* cited by examiner

SECURE ELECTRONIC LOCK

BACKGROUND

Current electronic locks fail to provide an ability to capture a key when the lock is operated. In a mechanical lock, the key is captured after the key is placed into the lock and rotated away from the "zero" position; after beginning rotation, the key cannot be removed from the lock except when placed in some predetermined positions. Virtually all mechanical locks operate in this manner, and so, users have been conditioned to rotate the key to one of the predetermined positions in order to remove their key. In a mechanical lock context, it is rare for a user to unintentionally leave the key in the lock.

In contactless (and most contact-based) electronic locking applications, the key is not captured by the lock while it is operated, and there is minimal incentive for a user to return to the locked state after completing a task. As a result, it is more common for electronic locks to be unintentionally left open relative to mechanical locks, thereby reducing security in an electronic context. Additionally, because of this weakness of being left unlocked, electronic locks are often designed with an ability to re-lock themselves, which ability requires more expensive designs including more batteries if a lock is wireless.

BRIEF SUMMARY

An embodiment of the disclosure is directed to a method for simulating an operation of a mechanical lock in an electronic context, comprising: applying a contactless wireless credential to a lock, authenticating the credential, unlocking the lock to provide access to a resource protected by the lock based on having authenticated the credential, determining a security level associated with the lock, and conditionally capturing the credential based on the security level.

An embodiment of the disclosure is directed to an apparatus comprising: at least one processor, and memory having instructions stored thereon that, when executed by the at least one processor, cause the apparatus to: receive an electronic credential to be applied to a lock, receive an indication that the lock has authenticated the credential, determine a security level associated with the lock, capture the credential when the security level is of a pre-defined security level, and restrict access to a second resource during a time when the credential is captured.

Additional embodiments are described below.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
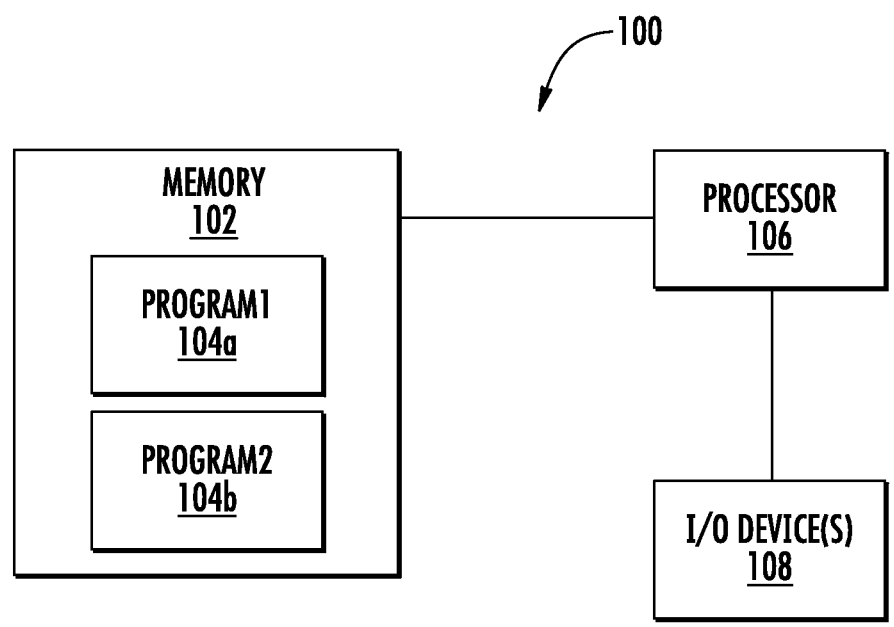
FIG. 1 is a schematic block diagram illustrating an exemplary computing system in accordance with one or more embodiments.

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect. In this respect, a coupling between entities may refer to either a direct or an indirect connection.

Exemplary embodiments of apparatuses, systems, and methods are described for enhancing security of electronic locks. In some embodiments, a key capture associated with a mechanical lock may be mimicked or simulated in an electronic context. A locked state in the electronic lock may be regulated or enforced by a policy. Different levels of security may be associated with the policy. In some embodiments, a contactless wireless key may interact with an electronic lock.

Referring to FIG. 1, an exemplary computing system 100 is shown. The system 100 is shown as including a memory 102. The memory 102 may store executable instructions. The executable instructions may be stored or organized in any manner and at any level of abstraction, such as in connection with one or more processes, routines, procedures, methods, etc. As an example, at least a portion of the instructions are shown in FIG. 1 as being associated with a first program 104a and a second program 104b.

The instructions stored in the memory 102 may be executed by one or more processors, such as a processor 106. The processor 106 may be coupled to one or more input/output (I/O) devices 108. In some embodiments, the I/O device(s) 108 may include one or more of a keyboard or keypad, a touchscreen or touch panel, a display screen, a microphone, a speaker, a mouse, a button, a remote control, a joystick, a printer, a telephone or mobile device (e.g., a smartphone), etc. The I/O device(s) 108 may be configured to provide an interface to allow a user to interact with the system 100.

The system 100 is illustrative. In some embodiments, one or more of the entities may be optional. In some embodiments, additional entities not shown may be included. For example, in some embodiments the system 100 may be associated with one or more networks. In some embodiments, the entities may be arranged or organized in a manner different from what is shown in FIG. 1. One or more of the entities shown in FIG. 1 may be associated with one or more of the devices or entities described herein.

Figure 2A:
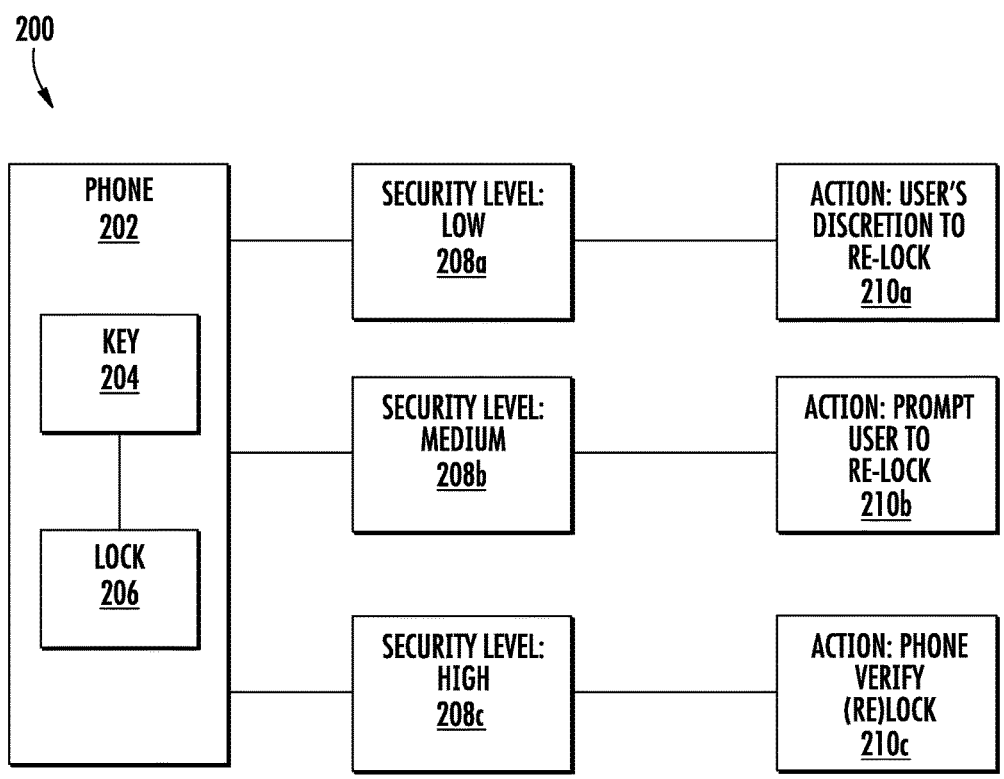
FIG. 2A illustrates an exemplary mobile phone environment for enforcing a security policy in accordance with one or more embodiments.

FIG. 2A illustrates an exemplary mobile phone system environment 200 for enforcing a security policy. While the system 200 is depicted in FIG. 2A as being based on a phone 202 (e.g., a mobile phone), other types of components or devices may be used in some embodiments. For example, in some embodiments a smart card may be presented to a 'reader' that is associated with a lock. In some embodiments, a (proprietary) FOB ID type of device may be configured with one or more interfaces (e.g., a display and buttons) that may enable a user to interact with a lock. The system 200 may be used to electronically simulate a key capture function of mechanical locks.

As shown in FIG. 2A, the phone 202 is associated with a key 204. The key may correspond to a credential that may be used to obtain access to a task or function associated with the phone 202. Much like a key used in a mechanical lock operation, a user's ability to access the task/function may be conditioned on a presentation or use of an appropriate key 204 to a lock 206. In some embodiments, the key 204 may correspond to, or include, a key fob.

Figure 2B:
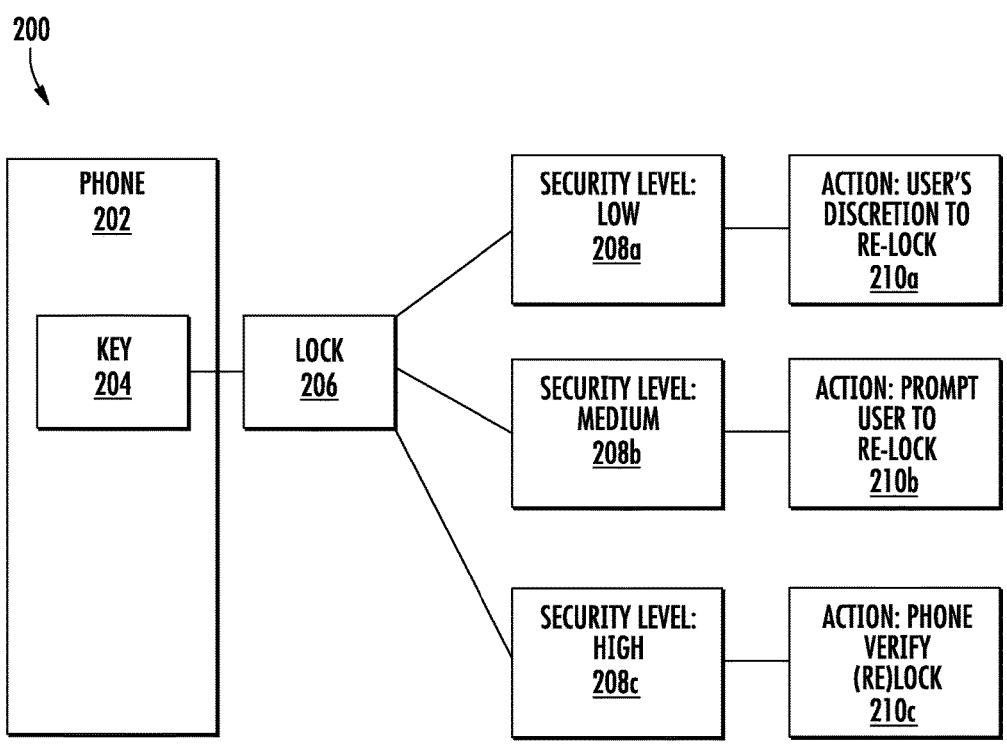
FIG. 2B illustrates an exemplary mobile phone environment for enforcing a security policy in accordance with one or more embodiments.

While the key 204 and lock 206 are shown in FIG. 2A as being present on the phone 202, in some embodiments one or both of the key 204 and the lock 206 may be present at another device or location (e.g., a server). For example, FIG. 2B illustrates an embodiment where the lock 206 is located external to the phone 202. In some embodiments, the lock 206 may correspond to a physical, electro-mechanical lock.

One or more devices may be communicatively coupled to one another via one or more networks, such that a key (e.g., key 204) present at a first device (e.g., phone 202) may be presented to a lock (e.g., lock 206) located at a second device.

In some embodiments, the key 204 may be communicated by the phone 202 using one or more communication techniques. For example, near field communication (NFC), Bluetooth, or another transmission (e.g., another wireless transmission) may be used.

Operation of the lock 206 may be associated with a security policy. The policy may be enforced at any level of computing abstraction. For example, the policy may be enforced with respect to a device (e.g., phone 202), a task or function associated with a device, an input or output to a device, etc.

The policy may have a number of levels associated with it. For example, as shown in FIGS. 2A and 2B, the policy may have low 208a, medium 208b, and high 208c levels of security. In some embodiments, more or less than three levels of security may be used. A selection of which security level 208a-208c to use may be a function of the lock 206, or more specifically, a resource (e.g., data or information) that the lock 206 serves to protect or provide conditional access to.

The security levels 208a-208c may be associated with one or more actions with respect to the lock 206 in regards to the state of the lock 206. For example, if the selected security level is low 208a, the user may present the key 204 to unlock the lock 206. The user may be responsible for re-locking the lock 206 when the task/function is complete, but the user might not receive any notification or reminder that the lock 206 is unlocked. Thus, the re-locking of the lock 206 may be left to the user's discretion 210a.

If the selected security level is medium 208b, the user may present the key 204 to unlock the lock 206. The user may gain access to the task/function protected by the lock 206 based on having presented the key 204, but might be precluded from performing any other operations until the lock 206 is re-locked. In this respect, a key-capture function associated with mechanical locks may be simulated, as the user's credentials may effectively be revoked until a re-lock status is indicated. Furthermore, the user may have an incentive to restore the lock 206 to the locked state after completing the task/function in order to gain access to the other operations.

In the medium security level 208b, the phone 202 may generate a prompt 210b (e.g., a displayed message, an auditory sound, etc.), potentially as a function of a timeout. The timeout may be based on a time that the lock 206 is in the unlocked state, an amount of activity or interaction (or lack thereof) with respect to the task/function, or some other condition. The prompt 210b may request the user to re-lock the lock 206, but might not actually confirm that the lock 206 has been re-locked. In some embodiments, the prompt 210b may persist until the user provides an indication that the user received the prompt 210b. For example, if the prompt 210b includes a displayed message (e.g., a pop-up message), the message may continue to be displayed until the user pushes, e.g., a key or button that indicates the user saw the message, at which point the message may then be removed from the display.

If the selected security level is high 208c, when the user presents the key 204 to unlock the lock 206 the user may gain access to the task/function protected by the lock 206, but might be precluded from performing any other operations until the lock 206 is re-locked similar to use of the medium security level 208b described above. However, the high security level 208c may include an additional layer of security. For example, rather than merely providing a prompt (e.g., prompt 210b) to the user to confirm that the lock 206 has been re-locked as in the medium security level 208b, in the high security level 208c the phone 202 may communicate with the lock 206 to confirm or verify that the user has re-locked the lock 206. The communication may take one or more forms. In some embodiments, the lock 206 may include one or more sensors that may provide a status (e.g., locked or unlocked) of the lock 206 to the phone 202. In some embodiments, a database associated with phone (e.g., cell phone) operations or functions may be consulted to confirm that the lock 206 is re-locked. In short, any technique may be used to confirm that the lock 206 is re-locked. Until the phone 202 verifies that the lock 206 is re-locked, the user's credentials may be effectively revoked.

Figure 3:
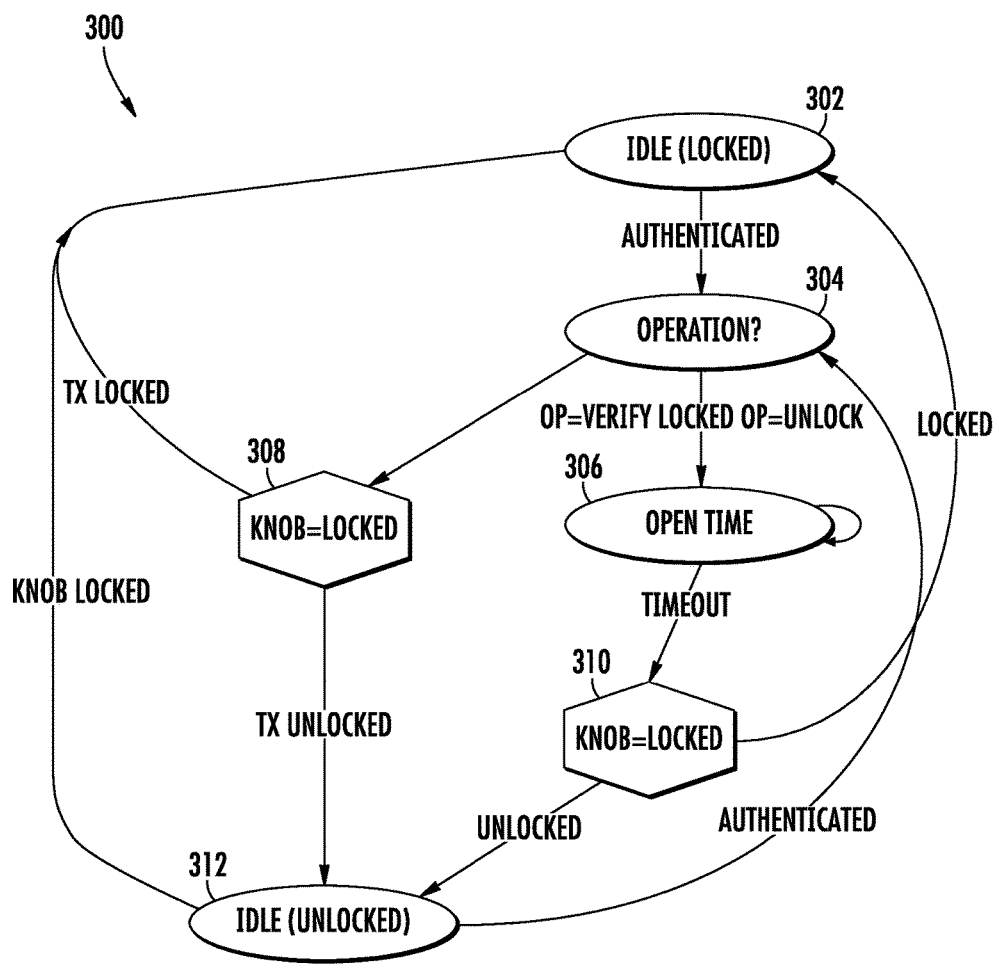
FIG. 3 illustrates a flow chart of an exemplary method in accordance with one or more embodiments.

Turning to FIG. 3, a flow chart of an exemplary method 300 is shown. The method 300 may execute in connection with one or more systems, components, or devices, such as those described above with respect to FIGS. 1-2. The method 300 may be executed to simulate a capture and/or control of a key in an electronic context. The method 300 may be executed to enforce a security policy.

Block 302 may correspond to an idle state of operation, and a lock (e.g., lock 206 of FIGS. 2A and 2B) may be in a locked state. Flow may continue to stay in block 302 until one or more credentials are received. The credentials may include a presentation of a key (e.g., key 204). In some embodiments, the credentials may include use of a gesture in front of a lock or lock core. For example, a hand gesture may be used when a phone is in hand. In some embodiments, the credentials may include one or more of a username, a password, a personal identification number (PIN), or a digital certificate. A credential may include a security policy and/or a user security level. For example, a digital certificate, which has a signature, may include information (e.g., a security policy), may be signed by a trusted authority (e.g., a server), and may be distributed to a user. The user may use the certificate as a 'key' to present to a lock. The certificate may include the security policy, permissions, etc. If the credential(s) are verified or authenticated, flow may proceed from block 302 to block 304.

In block 304, a determination may be made regarding a state of a requested operation (op). If the requested operation indicates an opening of the lock, flow may proceed from block 304 to block 306. Otherwise, if the requested operation indicates a verification of a locked state with respect to the lock, flow may proceed from block 304 to block 308.

In block 306, the lock may be unlocked for an amount of time. The amount of time may be based on one or more conditions or events and may be a function of a selected level of security. Flow may continue to stay in block 306 until the amount of time expires (timeout), at which point flow may proceed from block 306 to block 310.

In block 310, a determination may be made whether the lock is locked. A determination that a lock is locked may correspond to a determination of one or more of: (1) that a lock core itself is locked, (2) that a user or an automated return mechanism turned a lock core such that an attached lock mechanism is locked, and (3) that a user or an automated return mechanism turned a lock core but a lock mechanism remained unlocked (e.g., on a door a deadbolt can be locked without the door locking because the door is left open). If the determination of block 310 indicates that the lock is locked, flow may proceed from block 310 to block 302. Otherwise, if the lock is unlocked, flow may proceed from block 310 to block 312.

In block 308, a determination may be made whether the lock is locked. Similar considerations for determining whether a lock is locked as described above in connection with block 310 may be applied in connection with block 308. If the lock is locked, a transmission of the locked state of the lock may be provided (tx locked), and flow may proceed from block 308 to block 302. Otherwise, if the lock is unlocked, a transmission of the unlocked state of the lock may be provided (tx unlocked) and flow may proceed from block 308 to block 312.

Block 312 may correspond to an idle state of operation, and the lock may be in an unlocked state. Flow may continue to stay in block 312 until one or more credentials are received or the lock is locked. If one or more credentials are received, and the credentials are verified or authenticated, then flow may proceed from block 312 to block 304. Otherwise, if the lock is locked, flow may proceed from block 312 to block 302.

Figure 4:
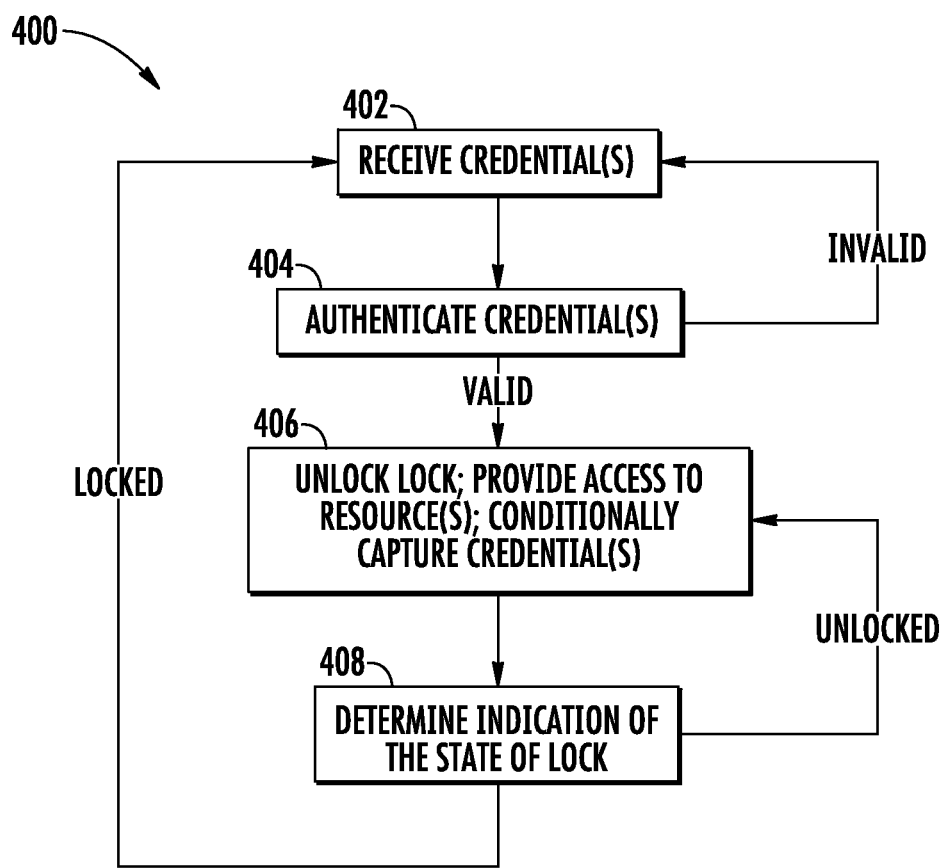
FIG. 4 illustrates a flow chart of an exemplary method in accordance with one or more embodiments.

Turning now to FIG. 4, a flow chart of an exemplary method 400 is shown. The method 400 may execute in connection with one or more systems, components, or devices, such as those described above with respect to FIGS. 1-2. The method 400 may be executed to simulate a capture and/or control of a key in an electronic context. The method 400 may be executed to enforce a security policy.

In block 402, one or more credentials may be received. The credentials may be associated with a lock that may provide conditional access to one or more resources.

In block 404, the received credentials may be authenticated or verified. If the credentials are valid, flow may proceed to block 406. Otherwise, if the credentials are invalid, flow may proceed back to block 402. In some embodiments, as part of the flow from block 404 to block 402 a counter may be incremented. The counter may be used to limit the number of attempts or tries that a user has to present valid credentials in order to increase security. When the value of the counter is greater than a threshold, a user may be prohibited from accessing the resource(s).

In block 406, the lock may be unlocked based on receipt of the valid credentials. Access to the one or more resources may be obtained based on the unlocking of the lock. If a selected security level is at a particular level (e.g., medium 208b or high 208c of FIGS. 2A and 2B), then the credential (e.g., key 204 of FIGS. 2A and 2B) may be captured. The capture of the credential may prohibit the use of other resources (e.g., other tasks or functions) until the lock is (re)locked.

One or more entities or devices may be configured to determine a security level and/or capture a credential. In some embodiments, a phone may determine a security level based on a credential itself (e.g., if the credential is a digital certificate) and the phone may capture the credential and not allow it to be used.

In some embodiments, a lock may determine a security level and inform a phone, and in response, the phone may capture a credential until the phone receives a message (from the user in a medium security level regime or from the lock in a high security level regime) that the lock is re-locked.

In some embodiments, a lock may determine a security level and the lock may capture a credential by writing to a phone or a smart card and permanently modify the credential until the lock is re-locked. Once the lock is re-locked, the lock may re-write a new credential that indicates that it is acceptable for use again.

In some embodiments, an indication may be sent to a server by, e.g., a lock or by a phone, that the lock is unlocked. The server may generate a message that disables a credential until a second indication is sent/received that indicates that the lock is re-locked. Based on the second indication, the server may generate a second message that releases the credential. The second message that releases the credential could be received by the phone and an application on the phone may prohibit use of the credential until released. Additionally, or alternatively, one or more messages may be sent to the lock and the lock may capture the credential.

Referring back to FIG. 4, in block 408, a determination may be made regarding an indication of the state of a lock (e.g., an indication from a user, potentially responsive to a prompt 210b, if using a medium security level 208b, or actual verification of a locked state 210c if using a high security level 208c). If the lock is unlocked, then flow may proceed from block 408 back to block 406, at which point access to the resource(s) protected by the lock may continue to be provided; however, access to other resources may be restricted if the credentials were captured. Otherwise, if the lock is locked, then flow may proceed from block 408 to block 402, at which point access to the resource(s) protected by the lock may be restricted and the credentials may be released if they were captured as part of block 406.

The methods 300 and 400 are illustrative. In some embodiments, one or more of the blocks or operations (or portions thereof) may be optional. In some embodiments, additional operations not shown may be included. In some embodiments, the operations may execute in an order or sequence different from what is shown.

Embodiments of the disclosure may be tied to one or more particular machines. For example, one or more devices, apparatuses, systems, or architectures may be configured to provide conditional access to a resource based on a state of a lock. A credential or key may be captured as part of unlocking the lock, which may provide an incentive to a user to restore the lock to the locked state once the user is done with the resource. In this respect, the likelihood or probability of a user unintentionally leaving an electronic lock in an unlocked state may be reduced, which may help to improve or enhance security.

Embodiments of the disclosure may be implemented in accordance with a distributed computing environment. Such an environment may be used to facilitate multi-user operations, optionally as a part of one or more networks (e.g., social networks). For example, a first user associated with a first device may unlock a lock in order to access a resource (e.g., to work on a given task or function), and a second user associated with the first device or a second device may restore the lock to a locked state. In some embodiments, one or more permission schemes or techniques may be employed to determine various user access rights with respect to a lock or a resource.

As described herein, in some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations.

Embodiments may be implemented using one or more technologies. In some embodiments, an apparatus or system may include one or more processors, and memory storing instructions that, when executed by the one or more processors, cause the apparatus or system to perform one or more methodological acts as described herein. Various mechanical components known to those of skill in the art may be used in some embodiments.

Embodiments may be implemented as one or more apparatuses, systems, and/or methods. In some embodiments, instructions may be stored on one or more computer-readable media, such as a transitory and/or non-transitory computer-readable medium. The instructions, when executed, may cause an entity (e.g., an apparatus or system) to perform one or more methodological acts as described herein.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional.

What is claimed is:

1. A method for simulating an operation of a mechanical lock in an electronic context, comprising:
    applying a contactless wireless credential to a lock;
    authenticating the credential;
    unlocking the lock to provide access to a resource protected by the lock based on having authenticated the credential;
    determining a security level associated with the lock; and
    conditionally capturing the credential based on the security level, wherein conditionally capturing the credential comprises revoking the credential until a re-lock status of the lock is indicated;
    wherein conditionally capturing the credential comprises when a low security level is associated with the lock, the credential is not captured;
    wherein conditionally capturing the credential comprises when a security level greater than the low security level is associated with the lock, the credential is captured to restrict access to a second resource during a time when the credential is captured;
    determining that the lock is relocked subsequent to unlocking the lock;
    based on determining that the lock is relocked, releasing the credential when the credential was captured.

2. The method of claim 1, wherein authenticating the credential comprises a validation of at least one of a key, a username, a password, and a personal identification number (PIN).

3. The method of claim 1, wherein the credential is captured responsive to determining that the security level corresponds to at least one of a medium security level and a high security level.

4. The method of claim 1, wherein the credential is captured responsive to determining that the security level corresponds to a medium security level, the method further comprising: causing a prompt to be presented that requests a response that the lock is relocked; receiving the response; and providing access to the second resource based on receiving the response.

5. The method of claim 1, wherein the credential is captured responsive to determining that the security level corresponds to a high security level, the method further comprising: verifying that the lock is relocked; and providing access to the second resource based on verifying that the lock is relocked.

6. The method of claim 1, wherein the lock is unlocked via a first device associated with a first user, the method further comprising: relocking the lock via a second device associated with a second user; and providing access to the first user to a second resource based on verifying that the lock is relocked.

7. The method of claim 1, wherein the lock is a physical, electro-mechanical lock.

8. The method of claim 1, wherein determining a security level associated with the lock comprises determining the security level based on an internal security policy associated with the lock and a security policy defined in the credential.

9. The method of claim 1, wherein the credential is captured so that access to subsequent resources is determined using a security policy.

10. The method of claim 1, wherein the lock is a removable lock core.

11. The method of claim 1, wherein the security level is based on a system-wide security policy, a user's credentials, and security policy associated with the lock.

12. An apparatus comprising:
    at least one processor; and
    memory having instructions stored thereon that, when executed by the at least one processor, cause the apparatus to:
    receive an electronic credential to be applied to a lock,
    receive an indication that the lock has authenticated the credential,
    determine a security level associated with the lock,
    conditionally capture the credential when the security level is of a pre-defined security level, wherein capturing the credential comprises revoking the credential until a re-lock status of the lock is indicated;
        wherein conditionally capturing the credential comprises when a low security level is associated with the lock, the credential is not captured;
        wherein conditionally capturing the credential comprises when a security level greater than the low security level is associated with the lock, the credential is captured to restrict access to a second resource during a time when the credential is captured;
    determine that the lock is relocked subsequent to unlocking the lock;
    based on determining that the lock is relocked, releasing the credential when the credential was captured.

13. The apparatus of claim 12, wherein the instructions, when executed by the at least one processor, cause the apparatus to: receive the electronic credential via a wireless transmission.

14. The apparatus of claim 13, wherein the wireless transmission comprises as least one of a near field communication (NFC) and a Bluetooth communication.

15. The apparatus of claim 12, wherein the apparatus comprises a mobile phone, and wherein an application configured to run on the mobile phone simulates the capture of the credential.

16. The apparatus of claim 12, wherein the apparatus comprises at least one of a smart card and a phone configured to emulate a smart card to the lock.

17. The apparatus of claim 12, wherein the instructions, when executed by the at least one processor, cause the apparatus to: receive an indication that the lock is relocked, and release the credential when the credential was captured based on the pre-defined security level.

18. The apparatus of claim 17, wherein the instructions, when executed by the at least one processor, cause the apparatus to: determine that a medium security level is used, cause a prompt to be presented based on determining that the medium security level is used, wherein the prompt requests a response that the lock is relocked after a timeout has expired, receive the response, and provide access to the second resource based on receiving the response.

19. The apparatus of claim 18, wherein the prompt comprises a pop-up message.

20. The apparatus of claim 17, wherein the instructions, when executed by the at least one processor, cause the apparatus to: determine that a high security level is used, verify that the lock is relocked based on determining that the high security level is used, and provide access to the second resource based on verifying that the lock is relocked.

21. The apparatus of claim 12, wherein the lock is a physical, electro-mechanical lock.

22. The apparatus of claim 12, wherein the apparatus comprises a phone, and wherein the credential comprises a hand gesture.

* * * * *